United States Patent
Wang et al.

(10) Patent No.: US 12,210,571 B2
(45) Date of Patent: Jan. 28, 2025

(54) GRAPH DATA PROCESSING METHOD, APPARATUS, AND DEVICE, AND MEDIUM

(71) Applicant: INSPUR SUZHOU INTELLIGENT TECHNOLOGY CO., LTD., Jiangsu (CN)

(72) Inventors: Yuanli Wang, Jiangsu (CN); Guoqiang Mei, Jiangsu (CN); Jiangwei Wang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 315 days.

(21) Appl. No.: 17/797,876

(22) PCT Filed: Nov. 4, 2020

(86) PCT No.: PCT/CN2020/126349
§ 371 (c)(1),
(2) Date: Aug. 5, 2022

(87) PCT Pub. No.: WO2021/169386
PCT Pub. Date: Sep. 2, 2021

(65) Prior Publication Data
US 2023/0334094 A1    Oct. 19, 2023

(30) Foreign Application Priority Data
Feb. 28, 2020 (CN) .......................... 202010131165.8

(51) Int. Cl.
*G06F 16/00* (2019.01)
*G06F 16/901* (2019.01)

(52) U.S. Cl.
CPC .............................. *G06F 16/9024* (2019.01)

(58) Field of Classification Search
CPC ........ G06F 7/36; G06F 16/9024; G06F 17/10; G06F 30/30
See application file for complete search history.

(56) References Cited

U.S. PATENT DOCUMENTS

| | | | |
|---|---|---|---|
| 6,434,721 B1* | 8/2002 | Chiluvuri | G06F 30/398 716/135 |
| 2019/0012407 A1* | 1/2019 | Li | G06F 7/36 |
| 2021/0211593 A1* | 7/2021 | Overbeck | H04N 25/41 |

FOREIGN PATENT DOCUMENTS

| | | |
|---|---|---|
| CN | 103970879 A | 8/2014 |
| CN | 108681482 A | 10/2018 |

(Continued)

OTHER PUBLICATIONS

International Search Report of corresponding PCT application PCT/CN2020/126349, mailed Feb. 3, 2021, 5 pgs.
(Continued)

*Primary Examiner* — Yicun Wu
(74) *Attorney, Agent, or Firm* — Cooper Legal Group, LLC

(57) ABSTRACT

A graph data processing method includes: acquiring target graph data to be processed; compiling statistics on the target graph data according to a first preset rule, so as to divide the target graph data into a plurality of graph data blocks and determine a boundary value and weight of each of the plurality of graph data blocks; and storing the boundary value and weight of each of the plurality of graph data blocks in a corresponding memory according to a second preset rule, so as to schedule the target graph data during a graph calculation process by use of the boundary values and the weights.

14 Claims, 3 Drawing Sheets

(56) References Cited

FOREIGN PATENT DOCUMENTS

| | | |
|---|---|---|
| CN | 109492131 A | 3/2019 |
| CN | 109508413 A | 3/2019 |
| CN | 110188099 A | 8/2019 |
| CN | 110688055 A | 1/2020 |
| CN | 111400521 A | 7/2020 |
| WO | 2016195455 A | 12/2016 |
| WO | 2019127300 A1 | 7/2019 |

OTHER PUBLICATIONS

Written Opinion of International Searching Authority of corresponding PCT application PCT/CN2020/126349, mailed Feb. 3, 2021, 9 pgs.

Notification to Grant Patent Right for Invention of corresponding CN priority application (CN202010131165.8), dated May 10, 2022.

\* cited by examiner

GRAPH DATA PROCESSING METHOD, APPARATUS, AND DEVICE, AND MEDIUM

This application claims priority to Chinese Patent Application No. 202010131165.8, filed on Feb. 28, 2020, in China National Intellectual Property Administration and entitled "Graph Data Processing Method, Apparatus, and Device, and Medium", the contents of which are hereby incorporated by reference in its entirety.

FIELD

The present disclosure relates to the technical field of graph data processing, and particularly to a graph data processing method, apparatus, and device, and a medium.

BACKGROUND

In emerging applications such as the World Wide Web, social networking, genome analysis, and medical informatics, graph becomes increasingly important for representing real network data. Graph data needs to be stored in memories, so storage is limited by memory resources and the graph size. Generally, a large graph needs to be divided into a plurality of subgraphs for storage, which often leads to the reduction of graph calculation performance due to low graph data scheduling efficiency. Therefore, how to accurately and quickly schedule a target subgraph block in graph calculation to complete graph calculation becomes important.

SUMMARY

In view of the foregoing problem, the present disclosure provides a graph data processing method, apparatus, device, and a medium, to solve or at least partially solve the foregoing problem.

A graph data processing method is provided, applied to a Field-Programmable Gate Array (FPGA), including:
  acquiring target graph data to be processed;
  compiling statistics on the target graph data according to a first preset rule, so as to divide the target graph data into a plurality of graph data blocks and determine a boundary value and a weight of each of the plurality of graph data blocks; and
  storing the boundary value and weight of each of the plurality of graph data blocks in a corresponding memory according to a second preset rule, so as to schedule the target graph data during a graph calculation process by use of the boundary values and the weights.

In some embodiments, before the step of compiling statistics on the target graph data according to the first preset rule, the method further includes:
  arranging the target graph data in a sequence from smallest to largest; or
  arranging the target graph data in a sequence from largest to smallest.

In some embodiments, the step of compiling statistics on the target graph data according to the first preset rule, so as to divide the target graph data into the plurality of graph data blocks and determine the boundary value and the weight of each of the plurality of graph data blocks includes:
  compiling statistics on the target graph data according to the first preset rule to determine a flag value corresponding to each piece of data in the target graph data; and
  dividing the target graph data into the plurality of graph data blocks according to the flag values, and determining the boundary value and the weight of each of the plurality of graph data blocks.

In some embodiments, the step of compiling statistics on the target graph data according to the first preset rule to determine the flag value corresponding to any piece of data in the target graph data includes:
  comparing the data with a next piece of data adjacent to the data, so as to judge whether the data is the same as the next piece of data adjacent to the data;
  in response to the data being the same as the next piece of data adjacent to the data, determining a first preset flag value as the flag value corresponding to the data; and
  in response to the data being different from the next piece of data adjacent to the data, determining a second preset flag value as the flag value corresponding to the data.

In some embodiments, during the step of comparing of the data and the next piece of data adjacent to the data, the method further includes:
  in response to the data being a last piece of data in the target graph data, determining 0 as the next piece of data adjacent to the data, so as to compare the data with the next piece of data adjacent to the data.

In some embodiments, the step of dividing the target graph data into the plurality of graph data blocks according to the flag values and determining the boundary value and the weight of each of the plurality of graph data blocks includes:
  judging whether a current flag value is the second preset flag value;
  in response to the current flag value being the second preset flag value, determining the current flag value as a first position flag value, and determining the second preset flag value closest to the current flag value before the current flag value, so as to determine a second position flag value;
  dividing the corresponding target graph data from a next flag value adjacent to the second position flag value to the current flag value determined as the first position flag value into one of the graph data blocks, and determining the target graph data corresponding to the current flag value as a boundary value of the current graph data block; and
  determining a data amount of the current graph data block as a weight of the current graph data block.

In some embodiments, the step of storing the boundary value and the weight of each of the plurality of graph data blocks in the corresponding memory according to the second preset rule includes:
  storing the boundary value and the weight of each of the plurality of graph data blocks to a corresponding target address by taking the boundary value of the graph data block as a target address, so as to store the boundary value and the weight of each of the plurality of graph data blocks in the memory.

A graph data processing apparatus is provided, applied to an FPGA, including:
  a data acquisition module, configured to acquire target graph data to be processed;
  a data statistics module, configured to compile statistics on the target graph data according to a first preset rule, so as to divide the target graph data into different graph data blocks and determine a boundary value and weight of each of the graph data blocks; and
  a data storage module, configured to store the boundary value and weight of each of the graph data blocks in a corresponding memory according to a second preset rule, so as to schedule the target graph data during a graph calculation process by use of the boundary values and the weights.

A graph data processing device is provided, including: a memory and a processor.

The memory is configured to store a computer program.

The processor is configured to execute the computer program to implement the graph data processing method as disclosed above.

A computer-readable storage medium is provided, configured to store a computer program that is executed by a processor to implement the graph data processing method as disclosed above.

By the above technical solutions, according to the graph data processing method, apparatus, and device, and medium provided in the present disclosure, target graph data to be processed is acquired first, then statistics on the target graph data is compiled according to a first preset rule, so as to divide the target graph data into different graph data blocks and determine a boundary value and weight of each of the graph data blocks, and the boundary value and the weight of each of the graph data blocks are stored in a corresponding memory according to a second preset rule, so as to schedule the target graph data during a graph calculation process by use of the boundary values and the weights. It can be seen that, in the present application, statistics on the acquired target graph data is compiled according to the first preset rule, so as to divide the target graph data into the plurality of graph data blocks and determine the boundary value and the weight of each of the graph data blocks, and then the boundary values and the weights of the graph data blocks are stored according to the second preset rule. In this way, the target graph data may be scheduled during the graph calculation process by use of the boundary values and the weights, a target graph data block may be quickly and accurately scheduled, the time for scheduling graph data is reduced, and the efficiency of graph data processing is improved.

The above description is a summary of the technical solutions of the present disclosure. In order to make the technical means of the present disclosure understood more clearly for implementation according to the contents of the specification and make the above-mentioned and other objectives, features, and advantages of the present disclosure clearer and easier to understand, specific implementation modes of the present disclosure are provided below.

BRIEF DESCRIPTION OF THE DRAWINGS

Various other advantages and benefits become apparent to those ordinarily skilled in the art upon reading the following detailed descriptions about preferred implementation modes. The drawings are only for showing the preferred embodiments rather than limiting the present disclosure. Moreover, in the whole drawings, the same reference signs are used to represent the same components. In the drawings.

DETAILED DESCRIPTION

Figure 1:
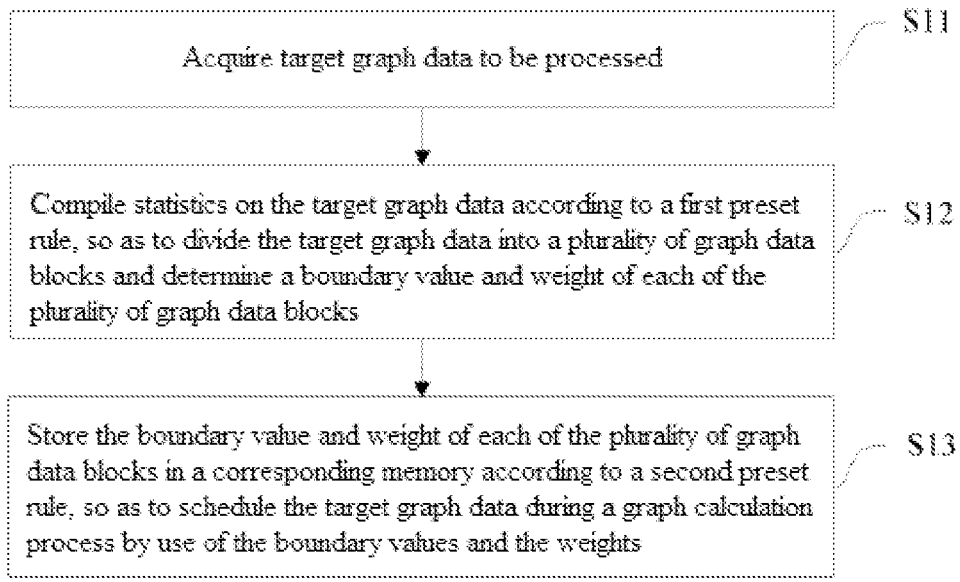
FIG. 1 is a flowchart of a graph data processing method according to the present application.

Exemplary embodiments of the present disclosure will now be described with reference to the drawings in more detail. Although the exemplary embodiments of the present disclosure are shown in the drawings, it is to be understood that the present disclosure may be implemented in various forms and should not be limited by the embodiments described herein. Instead, these embodiments are provided to make the present disclosure understood more thoroughly and deliver the scope of the present disclosure to those skilled in the art completely.

Currently, graph data needs to be stored in memories, storage is thereby limited by memory resources and the graph size. Generally, a large graph needs to be divided into a plurality of subgraphs for storage, which relates to how to accurately and quickly schedule a target subgraph block in graph calculation so as to solve the problem of reduction of graph calculation performance caused by low graph data scheduling efficiency. In view of this, the present application discloses a graph data processing method, to quickly and accurately schedule a target graph data block, reduce the time for scheduling graph data, and improve the efficiency of graph data processing.

As shown in FIG. 1, an embodiment of the present application discloses a graph data processing method, applied to an FPGA and including the following steps.

In step S11, target graph data to be processed is acquired.

During specific implementation, target graph data to be processed needs to be acquired first, so as to perform a corresponding subsequent process on the target graph data.

After the step that statistics on the target graph data is compiled according to a first preset rule, the method further includes that: the target graph data is arranged in a sequence from smallest to largest; or the target graph data is arranged in a sequence from largest to smallest. That is, the target graph data is arranged in a certain sequence for subsequent blocking. Arranging in a certain sequence includes arranging in a sequence from smallest to largest or arranging in a sequence from largest to smallest.

In step S12, statistics on the target graph data is compiled according to a first preset rule, so as to divide the target graph data into different graph data blocks and determine a boundary value and a weight of each of the plurality of graph data blocks.

It can be understood that, after the target graph data is acquired, it is further necessary to process the target graph data according to a first preset rule, so as to divide the target graph data into a plurality of graph data blocks and determine a boundary value and a weight of each of the plurality of graph data blocks. Specifically, the step that statistics on the target graph data is compiled according to a first preset rule, so as to divide the target graph data into a plurality of graph data blocks and determine a boundary value and a weight of each of the graph data blocks includes that: statistics on the target graph data is compiled according to the first preset rule to determine a flag value corresponding to each piece of data in the target graph data; and the target graph data is divided into the plurality of graph data blocks according to the flag values, and the boundary value and the weight of each of the plurality of graph data blocks are determined. That is, statistics on the target graph data is compiled first according to the first preset rule, so as to determine a flag value corresponding to each piece of data in the target graph data. Then, the target graph data is divided into the plurality of graph data blocks according to the flag values, and the boundary value and the weight of each of the plurality of graph data blocks are determined.

In step S13, the boundary value and the weight of each of the plurality of graph data blocks are stored in a corresponding memory according to a second preset rule, so as to schedule the target graph data during a graph calculation process by use of the boundary values and the weights.

After the boundary value and weight of each of the plurality of graph data blocks are obtained, it is further necessary to store the boundary value and the weight of each of the plurality of graph data blocks in a corresponding memory according to a second preset rule, so as to schedule the target graph data during a graph calculation process by use of the boundary values and the weights.

In a first specific implementation mode, the step that the boundary value and the weight of each of the plurality of graph data blocks are stored in a corresponding memory according to a second preset rule includes that: the boundary value and the weight of each of the plurality of graph data blocks are stored to a corresponding target address by taking the boundary value of the graph data block as a target address, so as to store the boundary value and the weight of each of the plurality of graph data blocks in the memory. Specifically, the boundary value and the weight of each of the plurality of graph data blocks are stored to a corresponding target address by taking the boundary value of each of the plurality of graph data blocks as a target address, so as to complete storing the boundary value and the weight of each of the plurality of graph data blocks in the memory.

In a second specific embodiment, the step that the boundary value and the weight of each of the plurality of graph data blocks are stored in a corresponding memory according to a second preset rule includes that: the weight of each of the graph data blocks is stored to a corresponding first target address by taking the boundary value of the graph data block as a first target address; and the weight and boundary value are read from the first target address, and the boundary value and the weight of each of the plurality of graph data blocks are stored to a corresponding second target address by taking the weight as a second target address, so as to complete storing the boundary value and the weight corresponding to each of the plurality of graph data blocks in the memory. If some graph data blocks have different boundary values but the same weight, corresponding second target addresses are determined according to a reading time sequence. Storing by taking the weight as the second target address ensures that a weight difference between adjacent graph data blocks is not so great, thereby reducing the time for processing graph data.

It can be seen that, according to the present application, target graph data to be processed is acquired first, then statistics on the target graph data is compiled according to a first preset rule, so as to divide the target graph data into a plurality of graph data blocks and determine a boundary value and a weight of each of the plurality of graph data blocks, and the boundary value and the weight of each of the plurality of graph data blocks are stored in a corresponding memory according to a second preset rule, so as to schedule the target graph data during a graph calculation process by use of the boundary values and the weights. It can be seen that, in the present application, statistics on the acquired target graph data is compiled according to the first preset rule, so as to divide the target graph data into the plurality of graph data blocks and determine the boundary value and the weight of each of the plurality of graph data blocks, and then the boundary values and the weights of the graph data blocks are stored according to the second preset rule. In this way, the target graph data may be scheduled during the graph calculation process by use of the boundary values and the weights, a target graph data block may be quickly and accurately scheduled, the time for scheduling graph data is reduced, and the efficiency of graph data processing is improved.

Figure 2:
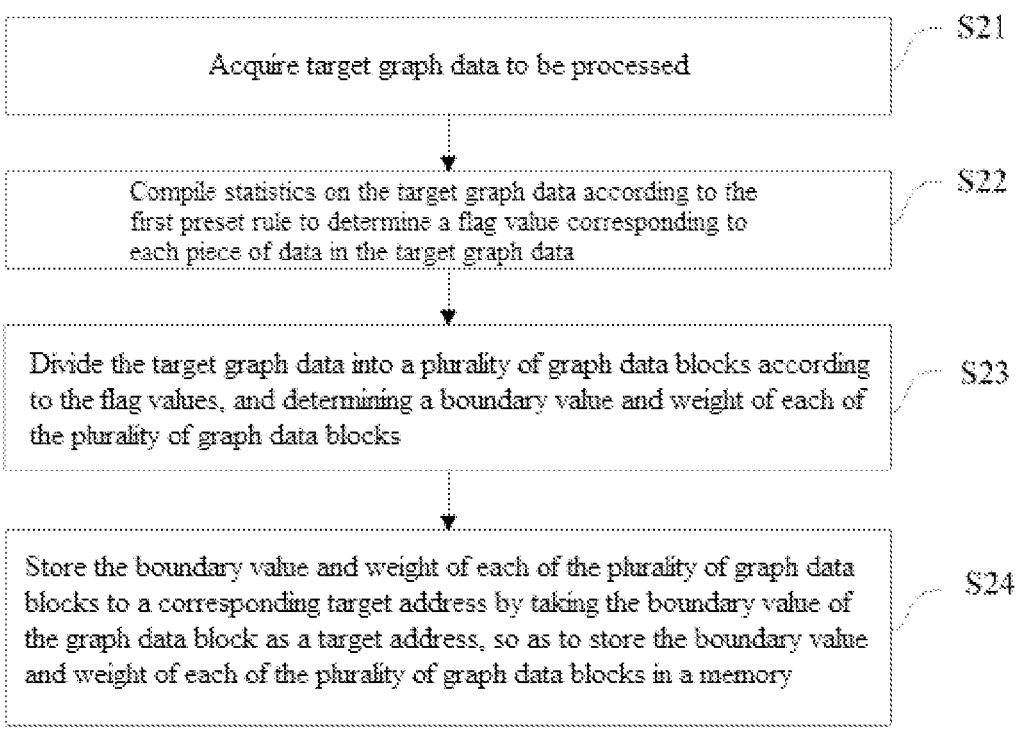
FIG. 2 is a flowchart of a specific graph data processing method according to the present application.

As shown in FIG. 2, an embodiment of the present application discloses a specific graph data processing method, applied to an FPGA and including the following steps.

In step S21, target graph data to be processed is acquired.

In step S22, statistics on the target graph data is compiled according to the first preset rule to determine a flag value corresponding to each piece of data in the target graph data.

During specific implementation, the target graph data may be arranged first in a sequence from largest to smallest or from smallest to largest to obtain arranged target graph data. Then, statistics on the arranged target graph data is compiled according to a first preset rule to determine a flag bit corresponding to each piece of data in the target graph data.

The step that statistics on the target graph data is compiled according to the first preset rule to determine a flag value corresponding to any piece of data in the target graph data includes that: the data is compared with the next piece of data adjacent to the data, so as to judge whether the data is the same as the next piece of data adjacent to the data; if the data is the same as the next piece of data adjacent to the data, a first preset flag value is determined as the flag value corresponding to the data; and if the data is different from the next piece of data adjacent to the data, a second preset flag value is determined as the flag value corresponding to the data. During the comparing of the data with the next piece of data, the method further includes that: if the data is the last piece of data in the target graph data, 0 is determined as the next piece of data adjacent to the data, so as to compare the data with the next piece of data adjacent to the data. Specifically, the flag value corresponding to any piece of data in the target graph data is obtained by comparing the data with the next piece of data adjacent to the data. If the data is equal to the next piece of data adjacent to the data, the flag value corresponding to the data is a first preset flag value. If the data is unequal to the next piece of data adjacent to the data, the flag value corresponding to the data is a second preset flag value. A data volume that may be processed in a clock cycle in the FPGA is related to a bus bit width, so flag values corresponding to data processed in a current clock cycle need to be registered first. After data in a next clock cycle is read, the last piece of data in the current clock cycle may be compared with the first piece of data in the next clock cycle to obtain the flag value corresponding to the last piece of data in the current clock cycle.

In step S23, the target graph data is divided into a plurality of graph data blocks according to the flag values, and a boundary value and a weight of each of the plurality of graph data blocks are determined.

Figure 3:
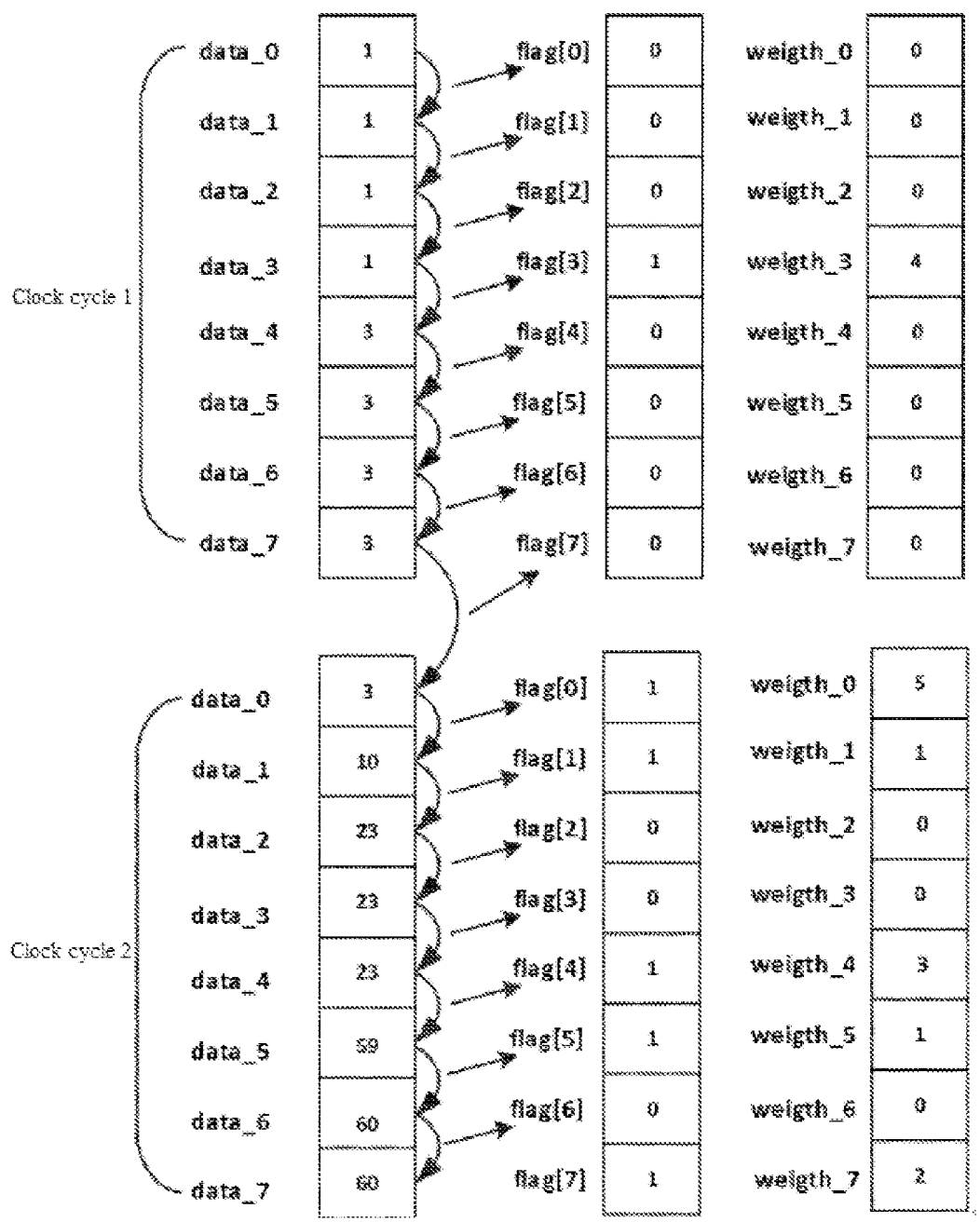
FIG. 3 is a specific flowchart of determining flag values and weights of graph data according to the present application.

After the flag value corresponding to each piece of data in the target graph data is determined, it is necessary to divide the target graph data into a plurality of graph data blocks according to the flag values and determine a boundary value and a weight of each of the plurality of graph data blocks. The step that the target graph data is divided into a plurality of graph data blocks according to the flag values and a boundary value and a weight of each of the plurality of graph data blocks are determined includes that: whether a current flag value is the second preset flag value is judged; if the current flag value is the second preset flag value, the current flag value is determined as a first position flag value, and the second preset flag value closest to the current flag value before the current flag value is determined, so as to determine a second position flag value; the corresponding target graph data from a next flag value adjacent to the second position flag value to the current flag value determined as the first position flag value is divided into a graph data block, and the target graph data corresponding to the current flag value is determined as a boundary value of the current graph data block; and a data amount of the current graph data block is determined as a weight of the current graph data block. FIG. 3 is a flowchart of determining flag values and weights of graph data. The first preset flag value is 0, the second preset flag value is 1, and the bus bit width is eight pieces of graph data. Graph data in two clock cycles is taken as an example, and labels data_0 to data_7 in each clock cycle represent eight pieces of data. data_0 and data_1 in clock cycle 1 are compared to obtain data_0=data_1=1, and then a flag value flag[0]=0 corresponding to data_0 is obtained. By parity of reasoning, flag[1]=0 and flag[2]=0 are obtained. data_3=1, data_4=3, and data_3 is unequal to data_4, so flag[3]=1. By parity of reasoning, flag values corresponding to the other data are obtained. data_7 in clock cycle 1 is compared with data_0 in clock cycle 2 to obtain flag[7]=0 in clock cycle 1. If data_7 in clock cycle 2 is the last piece of data in the target graph data, data_7 in clock cycle 2 is not 0, and flag[7]=1 in clock cycle 2 is obtained. According to the above flag values, the four pieces of data data_0 to data_3 in clock cycle 1 are divided into a graph data block corresponding to a weight of 4 and a boundary value of 1, the five pieces of data data_4 in clock cycle 1 to data_0 in clock cycle 2 are divided into a graph data block corresponding to a weight of 5 and a boundary value of 3, the data data_1 in clock cycle 2 is divided into a graph data block corresponding to a weight of 1 and a boundary value of 10, the three pieces of data data_2 to data_4 in clock cycle 2 are divided into a graph data block corresponding to a weight of 3 and a boundary value of 23, the data data_5 in clock cycle 2 is divided into a graph data block corresponding to a weight of 1 and a boundary value of 59, and the two pieces of data data_6 to data_7 in clock cycle 2 are divided into a graph data block corresponding to a weight of 2 and a boundary value of 60.

In step S24, the boundary value and the weight of each of the graph data blocks are stored to a corresponding target address by taking the boundary value of the graph data block as a target address, so as to store the boundary value and the weight of each of the graph data blocks in a memory.

Figure 4:
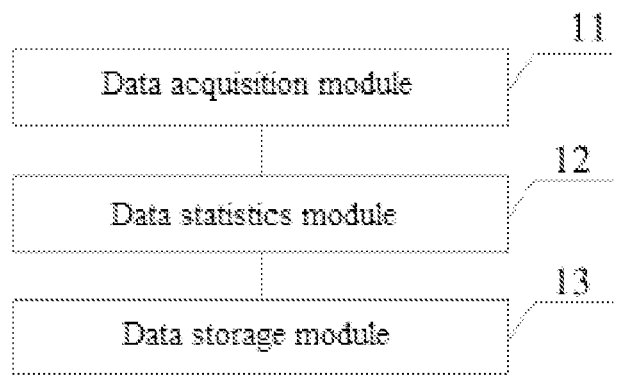
FIG. 4 is a schematic structural diagram of a graph data processing apparatus according to the present application.

As shown in FIG. 4, an embodiment of the present application discloses a graph data processing apparatus, applied to an FPGA and including.
 a data acquisition module 11, configured to acquire target graph data to be processed;
 a data statistics module 12, configured to compile statistics on the target graph data according to a first preset rule, so as to divide the target graph data into different graph data blocks and determine a boundary value and weight of each of the graph data blocks; and
 a data storage module 13, configured to store the boundary value and weight of each of the graph data blocks in a corresponding memory according to a second preset rule, so as to schedule the target graph data during a graph calculation process by use of the boundary values and the weights.

It can be seen that, according to the present application, target graph data to be processed is acquired first, then statistics on the target graph data is compiled according to a first preset rule, so as to divide the target graph data into different graph data blocks and determine a boundary value and weight of each of the graph data blocks, and the boundary value and weight of each of the graph data blocks are stored in a corresponding memory according to a second preset rule, so as to schedule the target graph data during a graph calculation process by use of the boundary values and the weights. It can be seen that, in the present application, statistics on the acquired target graph data is compiled according to the first preset rule, so as to divide the target graph data into the different graph data blocks and determine the boundary value and weight of each of the graph data blocks, and then the boundary values and weights of the graph data blocks are stored according to the second preset rule. In this way, the target graph data may be scheduled during the graph calculation process by use of the boundary values and the weights, a target graph data block may be quickly and accurately scheduled, the time for scheduling graph data is reduced, and the efficiency of graph data processing is improved.

Figure 5:
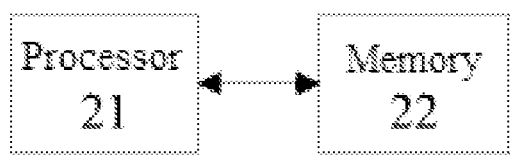
FIG. 5 is a structural diagram of a graph data processing device according to the present application.

Further, as shown in FIG. 5, an embodiment of the present application also discloses a graph data processing device, including a processor 21 and a memory 22.

The memory 22 is configured to store a computer program. The processor 21 is configured to execute the computer program to implement the graph data processing method disclosed in the above-mentioned embodiment.

The specific process of the graph data processing method may refer to the corresponding contents disclosed in the above-mentioned embodiment, and will not be elaborated herein.

Further, an embodiment of the present application also discloses a computer-readable storage medium, configured to store a computer program that is executed by a processor to implement the following steps:
 acquiring target graph data to be processed; compiling statistics on the target graph data according to a first preset rule, so as to divide the target graph data into a plurality of graph data blocks and determine a boundary value and a weight of each of the plurality of graph data blocks; and storing the boundary value and the weight of each of the plurality of graph data blocks in a corresponding memory according to a second preset rule, so as to schedule the target graph data during a graph calculation process by use of the boundary values and the weights.

It can be seen that, according to the present application, target graph data to be processed is acquired first, then statistics on the target graph data is compiled according to a first preset rule, so as to divide the target graph data into a plurality of graph data blocks and determine a boundary value and a weight of each of the plurality of graph data blocks, and the boundary value and the weight of each of the plurality of graph data blocks are stored in a corresponding memory according to a second preset rule, so as to schedule the target graph data during a graph calculation process by use of the boundary values and the weights. It can be seen that, in the present application, statistics on the acquired target graph data is compiled according to the first preset rule, so as to divide the target graph data into the plurality of graph data blocks and determine the boundary value and the weight of each of the plurality of graph data blocks, and then the boundary values and the weights of the plurality of graph data blocks are stored according to the second preset rule. In this way, the target graph data may be scheduled during the graph calculation process by use of the boundary values and the weights, a target graph data block may be quickly and accurately scheduled, the time for scheduling graph data is reduced, and the efficiency of graph data processing is improved.

In the present embodiment, a computer subprogram stored in the computer-readable storage medium may be executed by the processor to specifically implement the following step: arranging the target graph data in a sequence from smallest to largest; or, arranging the target graph data in a sequence from largest to smallest.

In the present embodiment, a computer subprogram stored in the computer-readable storage medium may be executed by the processor to specifically implement the following steps: compiling statistics on the target graph data according to the first preset rule, so as to determine a flag value corresponding to each piece of data in the target graph data; and dividing the target graph data into the plurality of graph data blocks according to the flag values, and determining the boundary value and the weight of each of the plurality of graph data blocks.

In the present embodiment, a computer subprogram stored in the computer-readable storage medium may be executed by the processor to specifically implement the following steps: comparing the data with the next piece of data adjacent to the data, so as to judge whether the data is the same as the next piece of data adjacent to the data; if the data is the same as the next piece of data adjacent to the data, determining a first preset flag value as the flag value corresponding to the data; and if the data is different from the next piece of data adjacent to the data, determining a second preset flag value as the flag value corresponding to the data.

In the present embodiment, a computer subprogram stored in the computer-readable storage medium may be executed by the processor to specifically implement the following step: if the data is the last piece of data in the target graph data, determining 0 as the next piece of data adjacent to the data, so as to compare the data with the next piece of data adjacent to the data.

In the present embodiment, a computer subprogram stored in the computer-readable storage medium may be executed by the processor to specifically implement the following steps: judging whether a current flag value is the second preset flag value; if the current flag value is the second preset flag value, determining the current flag value as a first position flag value, and determining the second preset flag value closest to the current flag value before the current flag value, so as to determine a second position flag value; dividing the corresponding target graph data from a next flag value adjacent to the second position flag value to the current flag value determined as the first position flag value into a graph data block, and determining the target graph data corresponding to the current flag value as a boundary value of the current graph data block; and determining a data amount of the current graph data block as a weight of the current graph data block.

In the present embodiment, a computer subprogram stored in the computer-readable storage medium may be executed by the processor to specifically implement the following step: storing the boundary value and the weight of each of the plurality of graph data blocks to a corresponding target address by taking the boundary value of the graph data block as a target address, so as to store the boundary value and the weight of each of the plurality of graph data blocks in the memory.

Those skilled in the art should know that the embodiment of the present application may be provided as a method, a system, or a computer program product. Therefore, the form of a pure hardware embodiment, a pure software embodiment, or an embodiment combining software and hardware may be used in the present application. Moreover, the form of a computer program product implemented on one or more computer-available storage media (including, but not limited to, a disk memory, a Compact Disc Read-Only Memory (CD-ROM), an optical memory, etc.) including computer-available program codes may be used in the present application.

The present application is described with reference to flowcharts and/or block diagrams of the method, device (system), and computer program product according to the embodiments of the present application. It is to be understood that each flow and/or block in the flowcharts and/or the block diagrams and combinations of the flows and/or blocks in the flowcharts and/or the block diagrams may be implemented by computer program instructions. These computer program instructions may be provided for a general-purpose computer, a special-purpose computer, an embedded processor, or a processor of another programmable data processing device to generate a machine, whereby a device configured to realize functions specified in one or more flows in the flowcharts and/or one or more blocks in the block diagrams is generated by the instructions executed by the computer or the processor of the other programmable data processing device.

Alternatively, these computer program instructions may be stored in a computer-readable memory capable of guiding the computer or the other programmable data processing device to work in a specific manner, whereby a product including an instruction device may be generated by the instructions stored in the computer-readable memory, the instruction device realizing the functions specified in one or more flows in the flowcharts and/or one or more blocks in the block diagrams.

Alternatively, these computer program instructions may be loaded to the computer or the other programmable data processing device, whereby a series of operating steps are executed on the computer or the other programmable data processing device to generate processing implemented by the computer, and steps for realizing the functions specified in one or more flows in the flowcharts and/or one or more blocks in the block diagrams are provided by the instructions executed in the computer or the other programmable data processing device.

In a typical configuration, a computing device includes one or more Central Processing Units (CPUs), an input/output interface, a network interface, and a memory.

The memory may include a volatile memory, Random Access Memory (RAM), non-volatile memory, and/or other forms, such as a Read-Only Memory (ROM) or a flash RAM, in computer-readable media. The memory is an example of the computer-readable medium.

The computer-readable medium includes nonvolatile and volatile as well as removable and irremovable media, and may store information by any method or technology. The information may be a computer-readable instruction, a data structure, a program module, or other data. Examples of the computer storage medium include, but not limited to, a Phase-change RAM (PRAM), a Static RAM (SRAM), a Dynamic RAM (DRAM), a RAM of another type, a ROM, an Electrically Erasable Programmable ROM (EEPROM), a flash memory or other memory technologies, a CD-ROM, a Digital Video Disk (DVD) or other optical memories, a cassette tape, a tape disk memory or other magnetic storage devices, or any other non-transmission media. The storage medium may be configured to store information accessible for the computing device. As defined herein, the computer-readable medium does not include transitory media, such as a modulated data signal and a carrier.

It is also to be noted that terms "include" and "contain" or any other variations thereof are intended to include nonexclusive inclusions, thereby ensuring that a process, method, commodity or device including a series of elements not only includes those elements, but also includes other elements which are not clearly listed, or further includes elements inherent to the process, the method, the commodity or the device. With no more restrictions, an element defined by statement "including a/an . . . " does not exclude the existence of another same element in a process, method, commodity, or device including the element.

Those skilled in the art should know that the embodiment of the present application may be provided as a method, a system, or a computer program product. Therefore, the form of a pure hardware embodiment, a pure software embodiment, or an embodiment combining software and hardware may be used in the present application. Moreover, the form of a computer program product implemented on one or more computer-available storage media (including, but not limited to, a disk memory, a CD-ROM, an optical memory, etc.) including computer-available program codes may be used in the present application.

The above is only the embodiment of the present application and not intended to limit the present application. Those skilled in the art may make various modifications and variations to the present application. Any modifications, equivalent replacements, improvements, etc., made within the spirit and principle of the present application shall fall within the scope of protection of the claims of the present application.

What is claimed is:

1. A graph data processing method, comprising:
acquiring target graph data to be processed;
compiling statistics on the target graph data according to a first preset rule, so as to divide the target graph data into a plurality of graph data blocks and determine a boundary value and a weight of each of the plurality of graph data blocks, wherein the compiling the statistics on the target graph data according to the first preset rule, so as to divide the target graph data into the plurality of graph data blocks and determine the boundary value and the weight of each of the plurality of graph data blocks comprises:
compiling the statistics on the target graph data according to the first preset rule to determine a flag value corresponding to each piece of data in the target graph data; and
dividing the target graph data into the plurality of graph data blocks according to the flag values, and determining the boundary value and the weight of each of the plurality of graph data blocks, wherein dividing the target graph data into the plurality of graph data blocks according to the flag values and determining the boundary value and the weight of each of the plurality of graph data blocks comprises:
judging whether a current flag value is a second preset flag value;
in response to the current flag value being the second preset flag value, determining the current flag value as a first position flag value, and determining the second preset flag value closest to the current flag value before the current flag value, so as to determine a second position flag value;
dividing corresponding target graph data from a next flag value adjacent to the second position flag value to the current flag value determined as the first position flag value into one of the plurality of graph data blocks, and determining the target graph data corresponding to the current flag value as a boundary value of a current graph data block;
determining a data amount of the current graph data block as a weight of the current graph data block; and
storing the boundary value and the weight of each of the plurality of graph data blocks in a corresponding memory according to a second preset rule, so as to invoke the target graph data during a graph calculation process by use of the boundary values and the weights.

2. The graph data processing method according to claim 1, wherein before the compiling the statistics on the target graph data according to the first preset rule, the method further comprises:
arranging the target graph data in a sequence from smallest to largest; or
arranging the target graph data in a sequence from largest to smallest.

3. The graph data processing method according to claim 1, wherein the compiling the statistics on the target graph data according to the first preset rule to determine the flag value corresponding to each piece of data in the target graph data comprises:
comparing the data with a next piece of data adjacent to the data, so as to judge whether the data is the same as the next piece of data adjacent to the data;
in response to the data being the same as the next piece of data adjacent to the data, determining a first preset flag value as the flag value corresponding to the data; and
in response to the data being different from the next piece of data adjacent to the data, determining the second preset flag value as the flag value corresponding to the data.

4. The graph data processing method according to claim 3, wherein during the comparing the data with the next piece of data adjacent to the data, the method further comprises:
in response to the data being a last piece of data in the target graph data, determining 0 as the next piece of data adjacent to the data, so as to compare the data with the next piece of data adjacent to the data.

5. The graph data processing method according to claim 1, wherein the storing the boundary value and the weight of each of the plurality of graph data blocks in the corresponding memory according to the second preset rule comprises:
storing the boundary value and the weight of each of the plurality of graph data blocks to a corresponding target address by taking the boundary value of the graph data block as a target address, so as to store the boundary value and the weight of each of the plurality of graph data blocks in the corresponding memory.

6. A graph data processing device, comprising:
a memory and a processor,
wherein the memory is configured to store a computer program; and
the processor is configured to execute the computer program to:
acquire target graph data to be processed;
compile statistics on the target graph data according to a first preset rule, so as to divide the target graph data into a plurality of graph data blocks and determine a boundary value and a weight of each of the plurality of graph data blocks, wherein the processor is configured to compile the statistics on the target graph data according to the first preset rule, so as to divide the target graph data into the plurality of graph data blocks and determine the boundary value and the weight of each of the plurality of graph data blocks by executing the computer program to:
  compile the statistics on the target graph data according to the first preset rule to determine a flag value corresponding to each piece of data in the target graph data; and
  divide the target graph data into the plurality of graph data blocks according to the flag values, and determine the boundary value and the weight of each of the plurality of graph data blocks, wherein the processor is configured to divide the target graph data into the plurality of graph data blocks according to the flag values and determine the boundary value and the weight of each of the plurality of graph data blocks by executing the computer program to:
    judge whether a current flag value is a second preset flag value;
    in response to the current flag value being the second preset flag value, determine the current flag value as a first position flag value, and determine the second preset flag value closest to the current flag value before the current flag value, so as to determine a second position flag value;
    divide corresponding target graph data from a next flag value adjacent to the second position flag value to the current flag value determined as the first position flag value into one of the plurality of graph data blocks, and determine the target graph data corresponding to the current flag value as a boundary value of a current graph data block; and
    determine a data amount of the current graph data block as a weight of the current graph data block; and
  store the boundary value and the weight of each of the plurality of graph data blocks in a corresponding memory according to a second preset rule, so as to invoke the target graph data during a graph calculation process by use of the boundary values and the weights.

7. The graph data processing device according to claim 6, wherein the processor is configured to execute the computer program to:
  arrange the target graph data in a sequence from smallest to largest; or
  arrange the target graph data in a sequence from largest to smallest.

8. The graph data processing device according to claim 6, wherein the processor is configured to execute the computer program to:
  compare the data with a next piece of data adjacent to the data, so as to judge whether the data is the same as the next piece of data adjacent to the data;
  in response to the data being the same as the next piece of data adjacent to the data, determine a first preset flag value as the flag value corresponding to the data; and
  in response to the data being different from the next piece of data adjacent to the data, determine the second preset flag value as the flag value corresponding to the data.

9. The graph data processing device according to claim 8, wherein the processor is configured to execute the computer program to:
  in response to the data being a last piece of data in the target graph data, determine 0 as the next piece of data adjacent to the data, so as to compare the data with the next piece of data adjacent to the data.

10. The graph data processing device according to claim 6, wherein the processor is configured to execute the computer program to:
  store the boundary value and the weight of each of the plurality of graph data blocks to a corresponding target address by taking the boundary value of the graph data block as a target address, so as to store the boundary value and the weight of each of the plurality of graph data blocks in the corresponding memory.

11. A non-transitory computer-readable storage medium configured to store a computer program that is executed by a processor to:
  acquire target graph data to be processed;
  compile statistics on the target graph data according to a first preset rule, so as to divide the target graph data into a plurality of graph data blocks and determine a boundary value and a weight of each of the plurality of graph data blocks, wherein the computer program is further executed by the processor to:
    compile the statistics on the target graph data according to the first preset rule to determine a flag value corresponding to each piece of data in the target graph data; and
    divide the target graph data into the plurality of graph data blocks according to the flag values, and determine the boundary value and the weight of each of the plurality of graph data blocks, wherein the computer program is further executed by the processor to:
      judge whether a current flag value is a second preset flag value;
      in response to the current flag value being the second preset flag value, determine the current flag value as a first position flag value, and determine the second preset flag value closest to the current flag value before the current flag value, so as to determine a second position flag value;
      divide corresponding target graph data from a next flag value adjacent to the second position flag value to the current flag value determined as the first position flag value into one of the plurality of graph data blocks, and determine the target graph data corresponding to the current flag value as a boundary value of a current graph data block; and
      determine a data amount of the current graph data block as a weight of the current graph data block; and
  store the boundary value and the weight of each of the plurality of graph data blocks in a corresponding memory according to a second preset rule, so as to invoke the target graph data during a graph calculation process by use of the boundary values and the weights.

12. The non-transitory computer-readable storage medium according to claim 11, wherein the computer program is executed by the processor to:
  arrange the target graph data in a sequence from smallest to largest; or
  arrange the target graph data in a sequence from largest to smallest.

13. The non-transitory computer-readable storage medium according to claim 11, wherein the computer program is executed by the processor to implement the following steps:
  compare the data with a next piece of data adjacent to the data, so as to judge whether the data is the same as the next piece of data adjacent to the data;
  in response to the data being the same as the next piece of data adjacent to the data, determine a first preset flag value as the flag value corresponding to the data; and
  in response to the data being different from the next piece of data adjacent to the data, determine the second preset flag value as the flag value corresponding to the data.

14. The non-transitory computer-readable storage medium according to claim 13, wherein the computer program is executed by the processor to:
  in response to the data being a last piece of data in the target graph data, determine 0 as the next piece of data adjacent to the data, so as to compare the data with the next piece of data adjacent to the data.

\* \* \* \* \*